(12) United States Patent
Li et al.

(10) Patent No.: US 11,535,542 B2
(45) Date of Patent: Dec. 27, 2022

(54) METHOD FOR QUICKLY CONVERTING ORGANIC WASTE INTO ENERGY

(71) Applicant: Tsinghua Shenzhen International Graduate School, Guangdong (CN)

(72) Inventors: Huan Li, Guangdong (CN); Yueling Liu, Guangdong (CN); Qi Jing, Guangdong (CN)

(73) Assignee: Tsinghua Shenzhen International Graduate School, Guangdong (CN)

( * ) Notice: Subject to any disclaimer, the term of this patent is extended or adjusted under 35 U.S.C. 154(b) by 473 days.

(21) Appl. No.: 16/736,829

(22) Filed: Jan. 8, 2020

(65) Prior Publication Data

US 2020/0140302 A1    May 7, 2020

Related U.S. Application Data

(63) Continuation of application No. PCT/CN2018/092030, filed on Jun. 20, 2018.

(30) Foreign Application Priority Data

May 18, 2018 (CN) .......................... 201810482512.4

(51) Int. Cl.
   *C02F 3/28* (2006.01)
   *C02F 11/04* (2006.01)
   *H01M 8/0612* (2016.01)

(52) U.S. Cl.
   CPC .............. *C02F 3/28* (2013.01); *C02F 11/04* (2013.01); *H01M 8/0612* (2013.01)

(58) Field of Classification Search
   CPC ....... C02F 11/04; C02F 11/121; C02F 11/122; C02F 11/127; C02F 2001/46142; C02F 2201/46115; C02F 2303/10; C02F 2303/18; C02F 3/005; C02F 3/28; H01M 8/0612
   See application file for complete search history.

(56) References Cited

U.S. PATENT DOCUMENTS

2004/0045885 A1    3/2004  Hiro

FOREIGN PATENT DOCUMENTS

| CN | 1868933 | 11/2006 | |
|---|---|---|---|
| CN | 101560524 | 10/2009 | |
| CN | 102277388 | 12/2011 | |
| CN | 102277388 A | * 12/2011 | ............ C12M 21/04 |
| CN | 102522571 A | 6/2012 | |
| CN | 103022546 A | 4/2013 | |
| CN | 107342432 A | 11/2017 | |
| JP | 2001229955 | 8/2001 | |
| JP | 2003-242987 A | 8/2003 | |

OTHER PUBLICATIONS

Of Zhang et al. "Direct Conversion of sewage sludge to electricity using polyoxomatelate catalyzed flow fuel cell" Sep. 29, 2017. Energy. vol. 141. pp. 1019-1026. (Year: 2017).*

Wang, Hongtao et al., "Rural solid waste treatment and resource utilization technology", Oct. 2006, p. 150, China Environmental Science Press, Beijing.

Xu Fan et al., "The Tests for Liquid-Catalyst Fuel Cell to Degrade Carbohydrates and Produce Electricity", Jul. 31, 2017, pp. 39-41, vol. 44, No. 14, guangdong chemical industry, China Academic Journal Electronic Publishing House.

Wei Liu et al., "Solar-induced direct biomass-to-electricity hybrid fuel cell using polyoxometalates as photocatalyst and charge carrier", Nature Communications, Feb. 7, 2014, pp. 1-8, vol. 5, Macmillan Publishers Limited.

Wei Liu et al., "High-Performance Liquid-Catalyst Fuel Cell for Direct Biomass-into-Electricity Conversion", Angew. Chem. Int. Ed., 2014, pp. 1-6, vol. 53, Wiley-VCH Verlag GmbH & Co. KGaA, Weinheim.

* cited by examiner

*Primary Examiner* — Latosha Hines
(74) *Attorney, Agent, or Firm* — Winston Hsu

(57) ABSTRACT

A method for quickly converting organic waste into energy, including the following steps of S1, performing anaerobic fermentation on organic waste to convert macromolecular organic matter in the organic waste into soluble small molecular organic matter to obtain fermentation liquid; S2, performing solid-liquid separation on the fermentation liquid to obtain a solid-phase part and a liquid-phase part, respectively; and S3, disposing or reusing the solid-phase part as residues, and enabling the liquid-phase part to enter a flow-catalyzed fuel cell to convert organic matter in the liquid-phase part into electrical energy. The present application can quickly and efficiently convert the organic waste into electrical energy.

8 Claims, No Drawings

METHOD FOR QUICKLY CONVERTING ORGANIC WASTE INTO ENERGY

CROSS REFERENCE TO RELATED APPLICATIONS

The present application is a Continuation Application of PCT Application No. PCT/CN2018/092030 filed on Jun. 20, 2018, which claim the priority of Chinese Patent Application No. 201810482512.4 filed on May 18, 2018. The contents of all of the above are hereby incorporated by reference.

BACKGROUND OF THE INVENTION

1. Field of the Invention

The present application relates to the technical field of energy conversion of organic waste, and in particular relates to a method for quickly converting organic waste into energy.

2. Related Art

Organic waste includes organic wastewater, sludge, kitchen waste, etc., which contains a large amount of water, but also contains high organic matter content, and has the potential of being converted into energy. At present, the main ways of energy conversion of organic waste include thermochemical processes, biological processes, etc. Thermochemical processes include incineration, co-firing, pyrolysis and other technologies. These technologies all require dehydration and drying of organic waste in advance and consume a large amount of energy, and the energy recovery efficiency of organic waste combustion process is low. Biological processes are mainly to convert organic waste into combustible gas such as methane by anaerobic microorganisms. However, these processes all have a long treatment cycle and low conversion rate of organic matter, and methane needs further combustion to generate heat or electricity, so the overall energy efficiency is also low. In addition to the above processes, application of fuel cells is a new way of energy conversion of organic matter with high energy efficiency. Among a variety of fuel cells, flow-catalyzed fuel cells can use complex organic matter containing a large amount of water as fuel at low temperatures (<100° C.). However, the existing flow-catalyzed fuel cells cannot convert lipids, and catalysts cannot be separated from treatment residues, so the flow-catalyzed fuel cells cannot be actually used to treat organic waste.

The disclosure of content in the related arts above is only used to assist in understanding the inventive concepts and technical solutions of the present application, and does not necessarily belong to the prior art of the present patent application. In the case where there is no clear evidence that the above content has been disclosed before the filing date of the present patent application, the related arts above should not be used to evaluate the novelty and creativity of the present application.

SUMMARY OF THE INVENTION

To make up for the shortcomings of the prior art, the present application provides a method for quickly converting organic waste into energy, which can significantly improve the energy conversion efficiency of organic waste.

The present application provides the following technical solution to achieve the above-mentioned object.

A method for quickly converting organic waste into energy includes the following steps:

S1. performing anaerobic fermentation on organic waste to convert macromolecular organic matter in the organic waste into soluble small molecular organic matter to obtain fermentation liquid;

S2. performing solid-liquid separation on the fermentation broth to obtain a solid-phase part and a liquid-phase part, respectively; and S3. disposing or reusing the solid-phase part as residues, and enabling the liquid-phase part to enter a flow-catalyzed fuel cell to convert organic matter in the liquid-phase part into electrical energy.

The above technical solution provided by the present application combines an anaerobic fermentation technology and an improved flow-catalyzed fuel cell technology. The anaerobic fermentation technology can realize quick conversion and decomposition of complex organic waste containing lipid components, and the flow-catalyzed fuel cell technology can quickly and directly convert fermentation liquid into electrical energy, thereby improving the efficiency of conversion of organic waste into electrical energy. Taking organic waste sludge as an example, compared with a treatment cycle of 15-30 days of anaerobic digestion and an energy conversion rate of only 15-40%, a treatment cycle of the method of the present application can be shortened to 3-7 days, and an energy efficiency can be increased to 45-50%.

Preferably, the flow-catalyzed fuel cell uses a proton exchange membrane to separate an anode and a cathode, ananolyte uses phosphomolybdic acid as catalysts, and air or pure oxygen is used as a cathode oxidant; and after the liquid-phase part enters the flow-catalyzed fuel cell, the flow-catalyzed fuel cell operates at 80-95° C. to convert the organic matter in the liquid-phase part into electrical energy.

Preferably, the phosphomolybdic acid is dissolved in the anolyte of the flow-catalyzed fuel cell. More preferably, after the process of converting the organic matter in the liquid-phase part into electrical energy, ammonium salt is added to the anolyte to form ammonium phosphomolybdate precipitates for phosphomolybdic acid recovery.

Preferably, the phosphomolybdic acid adheres to an anode electrode of the flow-catalyzed fuel cell, and after the process of converting the organic matter in the liquid-phase part into electrical energy, remaining water directly flows out of the flow-catalyzed fuel cell.

Preferably, the phosphomolybdic acid is combined with insoluble particles, and after the process of converting the organic matter in the liquid-phase part into electrical energy, the phosphomolybdic acid is recovered by a filtration, centrifugation or magnetic field separation process. The insoluble particles include carbon microspheres and/or magnetic particles.

Preferably, the step S1 is carried out in a fermentation reactor. More preferably, the fermentation type is butyric acid fermentation, propionic acid fermentation, ethanol fermentation, lactic acid fermentation or alkaline fermentation.

Preferably, during solid-liquid separation in step S2, a filtration or centrifugation process is used.

These and other objectives of the present invention will no doubt become obvious to those of ordinary skill in the art after reading the following detailed description of the preferred embodiment that is illustrated in the various figures and drawings.

DETAILED DESCRIPTION

The present application is further described below with reference to the detailed description.

A specific implementation of the present application provides a method for quickly converting organic waste into energy, including the following steps S1, S2, and S3.

Step S1. Anaerobic fermentation is performed on organic waste to convert macromolecular organic matter in the organic waste into soluble small molecular organic matter to obtain fermentation liquid. The anaerobic fermentation may be carried out in a fermentation reactor. The fermentation type may be, but is not limited to, butyric acid fermentation, propionic acid fermentation, ethanol fermentation, lactic acid fermentation or alkaline fermentation. In a preferred embodiment, the organic waste is organic waste containing lipids, and after the anaerobic fermentation, the lipid components in the organic waste are decomposed into small molecular organic matter such as short-chain fatty acids and glycerol.

Step S2. Solid-liquid separation is performed on the fermentation liquid to obtain a solid-phase part and a liquid-phase part, respectively. The solid-liquid separation in the step may use a filtration or centrifugation process.

Step S3. The solid-phase part is disposed or reused as residues, and the liquid-phase part enters a flow-catalyzed fuel cell to convert organic matter in the liquid-phase part into electrical energy.

In a preferred embodiment, the flow-catalyzed fuel cell used in the present application uses a proton exchange membrane to separate an anode and a cathode, ananolyte uses phosphomolybdic acid $H_3PMo_{12}O_{40}$ as a catalyst, and the cathode uses air or pure oxygen as an oxidant. After the liquid-phase part enters the flow-catalyzed fuel cell, the flow-catalyzed fuel cell operates at 80-95° C. to directly convert the organic matter in the liquid-phase part in the fermentation liquid into electrical energy. The phosphomolybdic acid as the anode catalyst may be dissolved in the anolyte of the flow-catalyzed fuel cell, or may be insoluble but adhere to the anode electrode, or may be combined with insoluble particles such as carbon microspheres and/or magnetic particles.

In the embodiment in which phosphomolybdic acid is dissolved in the anolyte of the flow-catalyzed fuel cell, after the process of converting organic matter in the liquid-phase part into electrical energy, ammonium salt may be added to the anolyte to form ammonium phosphomolybdate precipitates for phosphomolybdic acid recovery. In the embodiment in which phosphomolybdic acid adheres to the anode electrode, after the process of converting organic matter in the liquid-phase part into electrical energy, remaining water directly flows out of the flow-catalyzed fuel cell. In the embodiment in which phosphomolybdic acid is combined with the insoluble particles, after the process of converting organic matter in the liquid-phase part into electrical energy, the phosphomolybdic acid is recovered by a filtration, centrifugation or magnetic field separation process.

Taking certain kitchen waste as an example, the aforementioned method of the present application is used for quick energy conversion treatment. First, the kitchen waste was placed in a fermentation reactor and a residence time was set to be 4 days. The fermentation type was controlled to be butyric acid fermentation by alkali liquor. When the time was up, an obtained fermentation liquid was discharged from the fermentation reactor and then centrifuged. Total organic carbon (TOC) in a supernatant (liquid-phase part) accounted for 80% of the total TOC of the kitchen waste. The supernatant entered a flow-catalyzed fuel cell. After the concentration was adjusted, the initial TOC was 4.20 g/L. After 24 h treatment, the TOC was reduced to 1.30 g/L, and the conversion rate was about 70%. The whole process took 5 days, an organic matter conversion rate was 56% (based on TOC), and a system energy efficiency (output electrical energy/input energy) was 45.72%.

The foregoing content further describes the present application in detail with reference to specific exemplary embodiments, and the specification should not be construed as a limitation on the specific embodiments of the present application. A person skilled in the art, to which the present application belong, may make some equivalent replacements or obvious variations without departing from the principle of the present application, performance or functions of the replacements or variations are the same as that in the present application, and the replacements or variations should fall within the protection scope of the present application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for quickly converting organic waste into energy, comprising the following steps:
    S1. performing anaerobic fermentation on organic waste containing lipids to convert lipid components in the organic waste into soluble small molecular organic matter to obtain fermentation liquid, wherein the small molecular organic matter comprises short-chain fatty acids and glycerol;
    S2. performing solid-liquid separation on the fermentation liquid to obtain a solid-phase part and a liquid-phase part, respectively; and
    S3. disposing or reusing the solid-phase part as residues, and enabling the liquid-phase part to enter a flow-catalyzed fuel cell to convert the small molecular organic matter in the liquid-phase part into electrical energy;
    wherein the flow-catalyzed fuel cell uses a proton exchange membrane to separate an anode and a cathode, ananolyte uses phosphomolybdic acid as catalysts, and air or pure oxygen is used as a cathode oxidant; and after the liquid-phase part enters the flow-catalyzed fuel cell, the flow-catalyzed fuel cell operates at 80-95° C. to convert the small molecular organic matter in the liquid-phase part into electrical energy.

2. The method according to claim 1, wherein the phosphomolybdic acid is dissolved in the anolyte of the flow-catalyzed fuel cell.

3. The method according to claim 2, wherein after the process of converting the organic matter in the liquid-phase part into electrical energy, ammonium salt is added to the anolyte to form ammonium phosphomolybdate precipitates for phosphomolybdic acid recovery.

4. The method according to claim 1, wherein the phosphomolybdic acid adheres to an anode electrode of the flow-catalyzed fuel cell, and after the process of converting the organic matter in the liquid-phase part into electrical energy, remaining water directly flows out of the flow-catalyzed fuel cell.

5. The method according to claim 1, wherein the phosphomolybdic acid is combined with insoluble particles, and after the process of converting the organic matter in the liquid-phase part into electrical energy, the phosphomolybdic acid is recovered by a filtration, centrifugation or magnetic field separation method; and the insoluble particles comprise carbon microspheres and/or magnetic particles.

6. The method according to claim 1, wherein the step S1 is carried out in a fermentation reactor.

7. The method according to claim 6, wherein the fermentation type is butyric acid fermentation, propionic acid fermentation, ethanol fermentation, lactic acid fermentation or alkaline fermentation.

8. The method according to claim 1, wherein during solid-liquid separation in step S2, a filtration or centrifugation process is used.

* * * * *